United States Patent [19]

Uhler

[11] 3,878,327
[45] Apr. 15, 1975

[54] TELEVISION SYSTEM FOR IMPROVING READING SKILLS

[75] Inventor: Marcus H. Uhler, Pittsburgh, Pa.

[73] Assignee: Westinghouse Electric Corporation, Pittsburgh, Pa.

[22] Filed: Oct. 17, 1973

[21] Appl. No.: 407,328

[52] U.S. Cl. ........ 178/7.5 R; 35/35 B; 178/DIG. 35; 178/DIG. 6
[51] Int. Cl. ........................................... H04m 1/38
[58] Field of Search ............ 178/7.5 R, 7.5 D, 7.83, 178/5.8 R, DIG. 30, DIG. 35, DIG. 6, DIG. 21; 35/35 B

[56] References Cited
UNITED STATES PATENTS

| | | | |
|---|---|---|---|
| 2,162,766 | 6/1939 | Taylor | 35/35 B |
| 2,775,827 | 1/1957 | Stoyanoff | 35/35 B |
| 3,328,898 | 7/1967 | Raba | 35/35 B |
| 3,697,678 | 10/1972 | Belleson | 178/DIG. 6 |
| 3,732,365 | 5/1973 | Rando | 178/DIG. 6 |
| 3,757,432 | 9/1973 | Taylor | 35/35 B |

*Primary Examiner*—Howard W. Britton
*Assistant Examiner*—Michael A. Masinick
*Attorney, Agent, or Firm*—M. P. Lynch

[57] ABSTRACT

A TV system is provided for improving the reading skills by viewing selected information displayed within an isolated window defined within an otherwise blanked raster of the TV receiving tube. Blanking pulses are controlled to determine the dimensional size of the display window which corresponds to a selected portion of video scan lines. The disclosure provides in one form that the window is controlled to move along the TV screen as in a reading pacer device. A ramp generator controls the width of the blanking pulses to bring about horizontal movement of the window. The dimensional size and vertical position of the window are also controlled. In a second form, a time counter is used to limit the visual display of information in the window to a brief period of time to train the viewer in visual perception.

11 Claims, 6 Drawing Figures

TELEVISION SYSTEM FOR IMPROVING READING SKILLS

BACKGROUND OF THE INVENTION

This invention relates to a system to form a video display window within a blanked raster of a television receiving tube which is particularly useful when a television system is used as an educational teaching aid.

A reading pacer or reading rate controller is a device used in the instruction of developmental reading or speed reading. Typically, it consists of a cover or a screen that is moved at a controlled rate so that words of printed material are displayed sequentially. The student is thus forced to read at a controlled rate and is prevented from having regressions. A second and preferred type of reading pacer displays only several words at a time which may be brought about by displaying a portion of a continuously moving tape containing printed material. The displayed portion of the printed material is, therefore, limited to only that which the student would see in one visual fixation.

In one form of the present invention, there is provided a TV receiver system wherein blanking of the video signal brings about limited display of selected video portions within a window defined in the raster of the TV screen.

The underlying principle and circuitry employed to provide such a video display window within a television screen are also useful for a different aspect in the field of educational teaching aids. This has reference to a tachistoscope which is based on the principle of a visual display of information for a brief period of time. Typically, in the past, such a device has been in the form of a slide projector with a shutter. A tachistoscope is commonly used to train visual perception and attention, particularly for reading improvement or for the development of reading skills. It is a common practice to display a group of digits, a word, a phrase or even a sentence for a fraction of a second. The student is then called upon to recall what he saw during the display.

The present invention additionally provides a system for use with a TV receiver or monitor for converted use as a tachistoscope. This has the distinct advantage that a TV receiver or monitor does not require a darkened room whereas a tachistoscope projector usually requires such an environment that is cumbersome to provide as well as an unnatural environment for a learning process. In an educational TV system wherein each student is provided with a TV monitor or receiver, the visual display or program material may be individualized for each student whereas the use of a projector requires that all students view the same program material for the same time display period.

SUMMARY OF THE INVENTION

In accordance with the present invention, there is provided a system to form a video display window within a blanked raster of a television receiving tube, the combination comprising a television receiver for deriving a video signal corresponding to scan lines of video information for display on the receiving tube, a blanker for defining a video signal display window within the blanked raster of the television receiving tube, means for delivering blanking pulses to the blanker for controlling the dimensional size of the display window by selecting portions of a plurality of video scan lines and a control for timing the display period of video signals by the display window.

In one aspect, the present invention specifically provides a monostable multivibrator for controlling the width of the aforedescribed window, a ramp generator provides a control signal for a second monostable multivibrator whose output controls the linear movement of the window across the raster, and a threshold detector resets the ramp generator when its output represents that the window has reached an edge of the TV screen.

The system additionally includes means for selectively controlling the vertical position of the window, means for controlling the vertical width of the window, and means for indexing the window vertically so that successive lines of printed material can be successively displayed.

In another aspect, the present invention additionally provides a control for adjustably determining the width of the display window within the television raster and a pulse counter responsive to sync pulses for controlling the actual video signal display time.

These features and advantages of the present invention as well as others will be more apparent when the following description is read in light of the accompanying drawings, in which.

Figure 1:
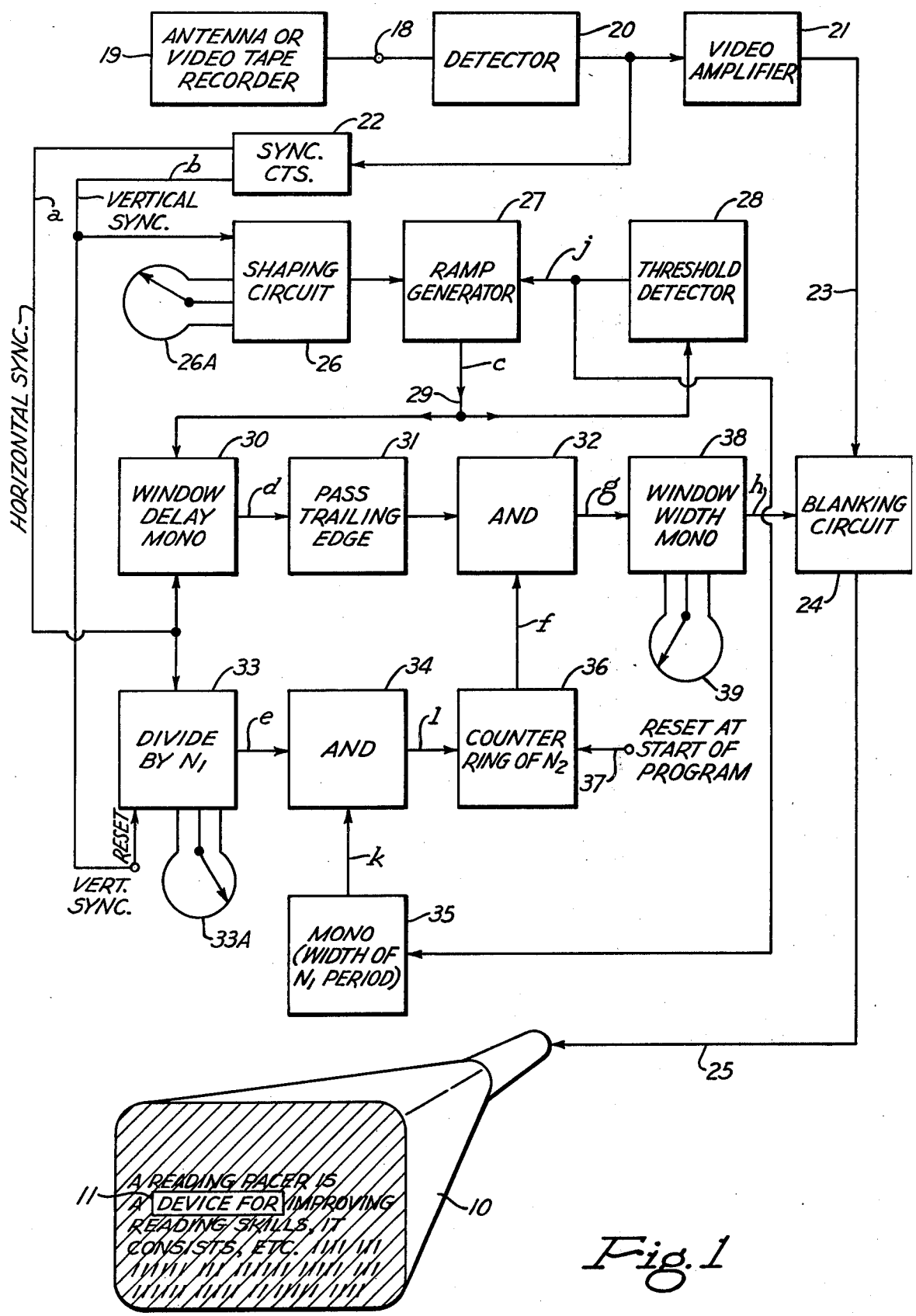
FIG. 1 is a block diagram of the circuitry embodying the features of the present invention to provide a reading pacer.

With reference now to the aspect of the present invention addressed to a reading pacer, in its preferred form a page of stationary printed material is transmitted to one or more TV receivers or monitors where the rasters are blanked out except for an aperture or window which permits only a desired portion of the printed material to be displayed. In FIG. 1, there is illustrated a TV cathode-ray tube 10 intended to depict the raster of a TV which is blanked as represented by the diagonal lines so that an unblanked window 11 is provided to depict the words DEVICE FOR. This window has a height of one printed line and a width of several words as desired. The window is controlled so that it moves across each printed line from left to right, as one views FIG. 1, in a lineal manner and at the end of the printed line, the window is indexed down to the beginning of the next printed line. The width and speed of the window are adjustable. In this manner, the printed material A READING PACER IS A DEVICE FOR IMPROVING READING SKILLS, IT CONSISTS, ETC. may be successively exposed by the window 11 for viewing by the reader.

Figure 2:
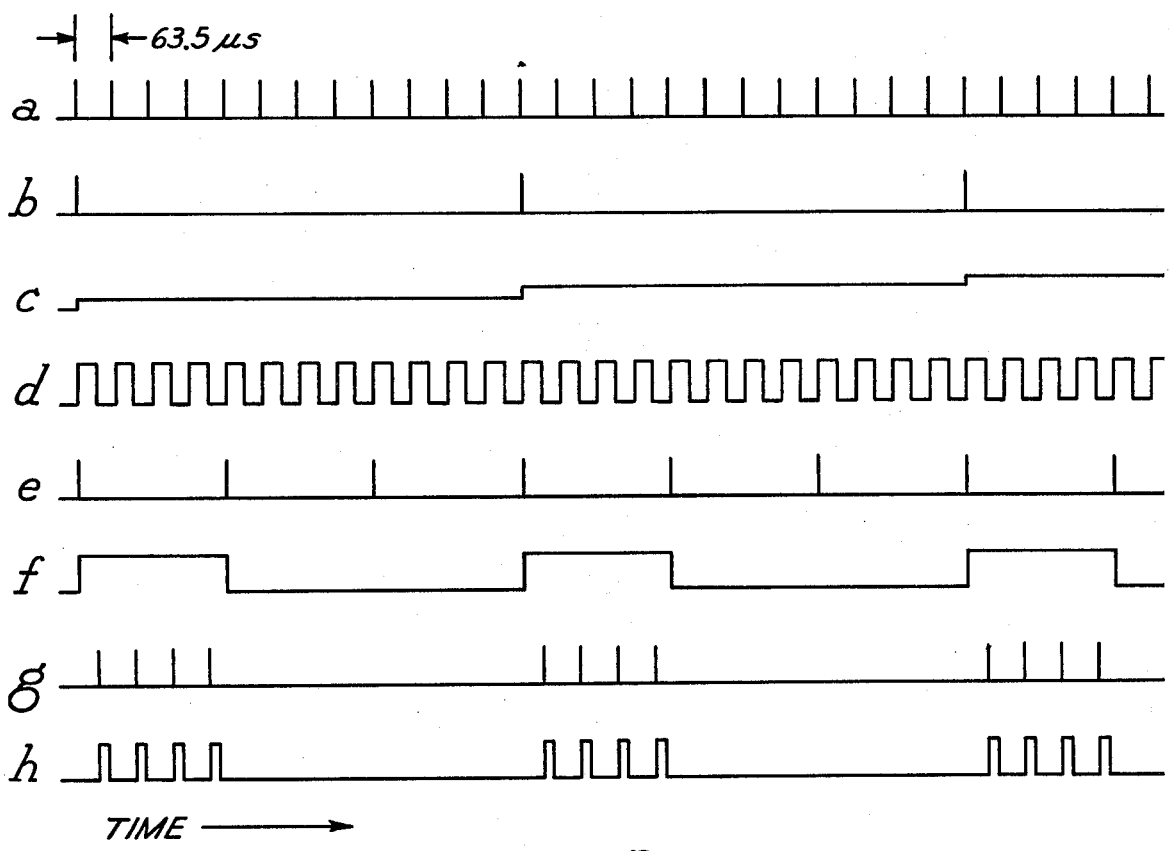
FIGS. 2 and 3 are different time base waveforms illustrating the operation of the circuitry shown in FIG. 1.
Figure 3:
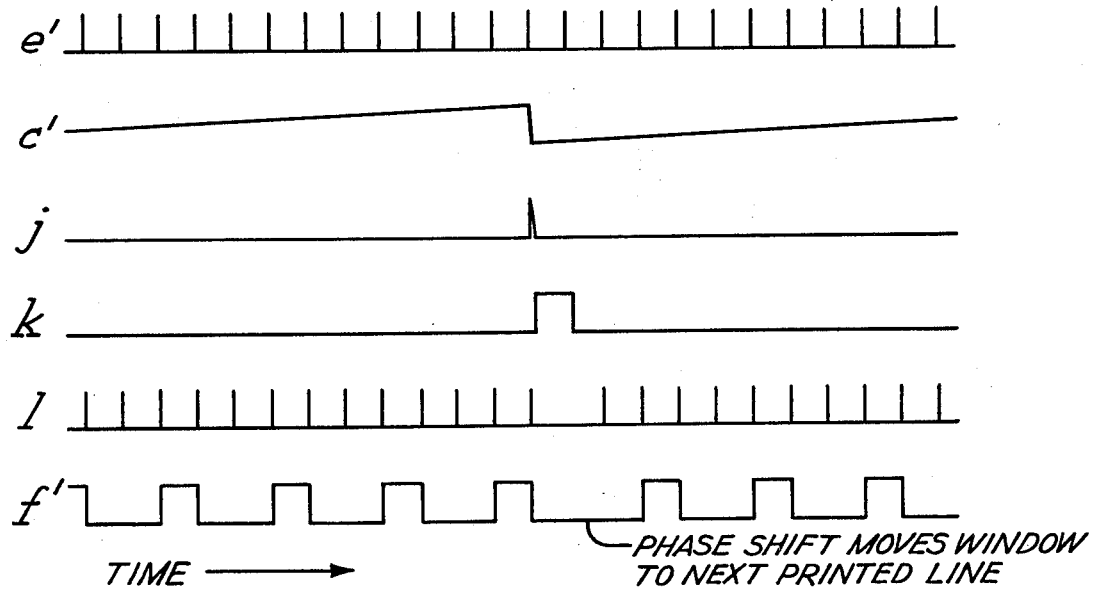

The system for producing this window is incorporated with the TV receiver and the source of printed material as indicated is transmitted by a TV transmitter or video tape recorder. Thus, each TV receiver may be individually adjusted to provide a window width and reading pacer speed for the individual student. The circuitry illustrated in FIG. 1 includes a terminal 18 connected to an antenna or tape recorder 19 providing an input signal to a detector 20. This detector delivers a composite video signal which includes sync pulses to a video amplifier 21 and a sync circuit generator 22. The video signal from amplifier 21 is delivered by line 23 to a blanking circuit 24 where the video signal is blanked out to the extent that the video display window 11 is left unblanked to display video information which is transmitted along line 25 to the receiving tube 10. The sync circuits 22 provide horizontal sync pulses which are typically illustrated by the waveform $a$ of FIG. 2 and vertical sync pulses illustrated typically by the waveform $b$. The vertical sync pulses are applied to a shaping circuit 26 that also receives a biasing signal from a potentiometer 26A for providing a window displacement speed adjustment. The output signal from the shaping circuit is delivered to a ramp generator 27 that also receives a reset signal with the waveform $j$ (FIG. 3) from a threshold detector 28. The ramp generator has an output signal in line 29 with the waveform $c$ which is branched to provide an input signal to the threshold detector 28 and apply a signal to a window delay monostable multivibrator 30. The ramp generator output signal is further represented by waveform $c'$ over a long period of time as compared with waveform $c$. It is to be understood that waveforms $e'$, $c'$, $j$, $k$, $l$ and $f'$ of FIG. 3 are on a different time scale from that of the waveforms shown in FIG. 2.

The monostable multivibrator 30 receives horizontal sync pulses according to waveform $a$ and produces a signal with the waveform $d$ delivered to a differentiating circuit 31 for detecting the passage of the trailing edge defining the leading edge of the window 11. The output from differentiating circuit 31 is a signal delivered to an AND circuit 32.

The AND circuit 32 receives a signal with the waveform $f$ produced by delivering the horizontal sync pulse according to waveform $a$ to the divide circuit which additionally receives the vertical sync pulses and a biased signal from a potentiometer 33A. Potentiometer 33A is manually set according to the number of scan or TV lines making up a printed line to the blanking circuit 24. The divide circuit produces a signal with the waveform $e$ corresponding to the number of TV horizontal scan lines making up a printed line. This signal is delivered to an AND circuit 34 where it is inhibited by a signal with the waveform $k$ produced from monostable multivibrator 35. The multivibrator 35 produces a signal pulse in response to the output from the threshold detector 28 which is representative of the pulse width of the $N_1$ time period. The circuit 34 ANDs the signals with the waveforms $e$, $e'$ and $k$ to produce a signal pulse having the waveform $l$ delivered to a ring counter 36 which counts a number of pulses, $N_2$, that correspond to the number of printed lines in the TV raster. The counter is reset by a signal in line 37 at the start of each program. The output from the counter has the waveform $f$ and is ANDed with the output of differentiating circuit 31 by the AND circuit 32 to produce a signal with the waveform $g$ to a window width monostable multivibrator 38 which is biased by a window width adjustment potentiometer 39. The output signal from the window width monostable multivibrator 38 has the waveform which is delivered to the blanking circuit 24.

The blanking circuit 24 creates the window in the video signal by blanking out all unwanted video scan lines and portions of scan lines. The width of the window is controlled by the monostable multivibrator 38. The horizontal position of the window is determined by the window delay monostable multivibrator 30. The ramp generator output serves as a supply voltage of a normally OFF switch of the window delay monostable multivibrator. Hence, the delay of the monostable multivibrator 30 is a linear function of the ramp generator 27. Therefore, the window moves linearly across the raster of the TV tube 10. At the top of the ramp, the window is at the end of the printed line. At this point, the threshold detector resets the ramp generator and the window starts again at the lefthand edge of the raster. The vertical position of the window is determined by the counter 36. The divide by $N_1$ circuit 33 generates a pulse for each printed line, where $N_1$ is the number of horizontal video lines making up one printed line. The divide by $N_1$ output after modification by the AND circuit 34 drives the ring of counter 36 which selects the printed line to be displayed. When the window reaches the end of the printed line, the threshold detector 28 produces an output which inhibits a pulse from the divide by $N_1$ circuit, resulting in a phase change of the ring counter which is shown in regard to waveform $f'$ in FIG. 3.

The window could be made to move in discrete steps in the horizontal direction rather than continuously. This would prevent parts of a word from being displayed and in this event, the vertical borders of the window would be determined by the location of blank spaces between the words. Additional circuitry would be required to carry out this which would be readily apparent to those skilled in the art. The area outside the window is blanked as discussed previously and, therefore, it is substantially without light. It may be desirable, in certain instances, for the blanked area to be white or the same gray scale as the background inside the window. This may be readily accomplished by modifying the blanking circuit to blank the video signal to an adjustable level.

Figure 4:
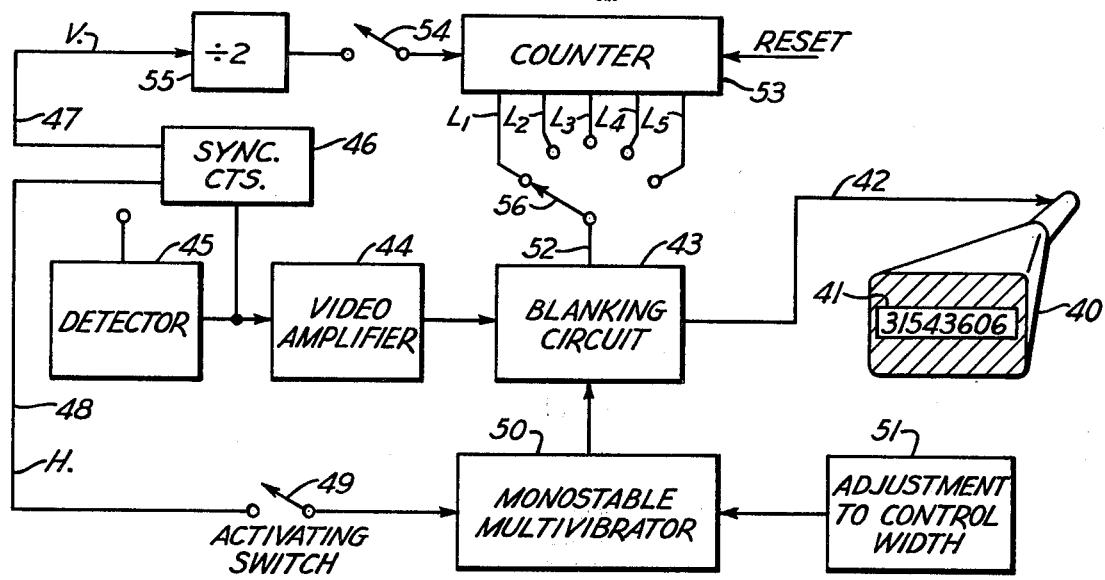
FIG. 4 is a block diagram of the circuitry to apply a tachistoscope principle to a television system according to the present invention.

In FIG. 4, there is illustrated a second form of the present invention relating to providing circuitry for tachistoscope display by means of a TV receiver. Each program could be transmitted for a given number of TV frames. Preferably, however, the transmitters are provided with a frame counter to select the number of TV frames to be displayed. The program to be presented may be stored on a slide for use by a flying spot scanner or on a video tape or other conventional means may be employed. The program, for example, could be a horizontal line of digits which are displayed by a receiving tube 40 having a window 41 defined within the blanked raster. As shown, within the window, a series of digits may be transmitted to each of a plurality of receivers and consists of the number 31543606.

It will be understood that each TV receiver or monitor has the circuitry to be described so that each receiver may be controlled to determine the amount of the video signal in the field to be displayed. The blanked video signal is transmitted by a line 42 from a blanking circuit 43. The blanking circuit receives the entire video signal from a video amplifier 44 driven by the output from a detector 45. The output from the detector is also connected to a sync generator circuit 46 which provides vertical sync pulses in line 47 and horizontal sync pulses in line 48. The horizontal sync pulses are applied through a switch 49 to a monostable multivibrator 50 which receives a biased adjustment to control the window width from a potentiometer 51 in a similar manner as previously described with respect to FIG. 1.

The output from the monostable multivibrator 50 is connected to the blanking circuit. This circuit additionally receives a control signal in line 52 from a resettable counter 53 which is activated by a switch 54 to receive the output from a divide by 2 circuit 55 receiving the vertical sync pulses in line 47. The counter has output lines L1-L5 which can be selectively connected to the blanking circuit by a movable feeler arm 56 to thereby deliver to the circuit, for example, from line L1 a count of one frame produced by the output of the divide by 2 circuit 55. In a similar manner, line L2 provides a count of two video frames, line L3 a count of three video frames, line L4 a count of four video frames and line L5 a count of five video frames. These counts of video frames represent timing pulses for a window information display time.

Figure 5:
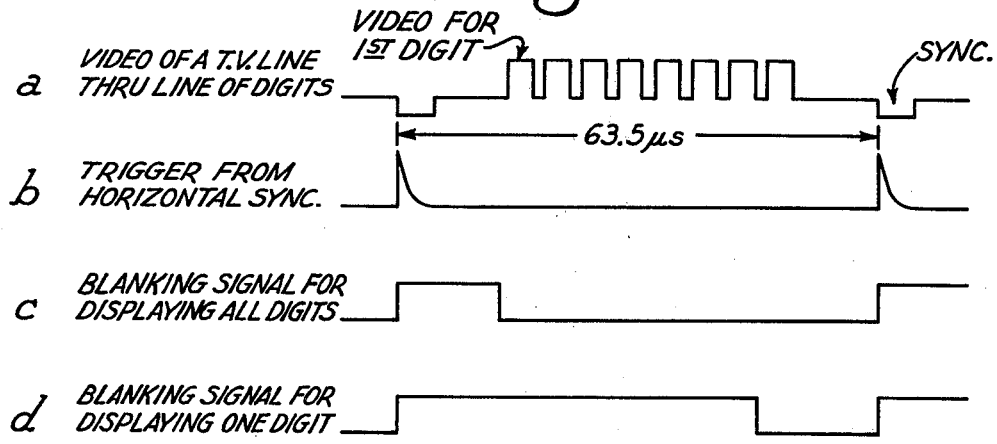
FIGS. 5 and 6 are different time base waveforms illustrating the operation of the circuitry shown in FIG. 4.
Figure 6:
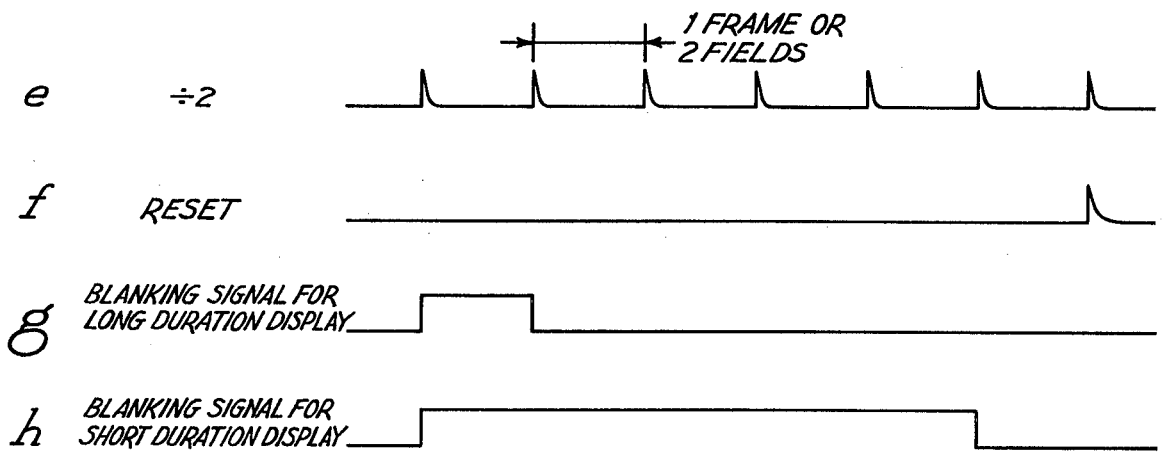

Turning, now, to the waveforms of FIGS. 5 and 6 and first with respect to waveform $a$ of FIG. 5, there is illustrated a typical waveform of a horizontal video scan line transmitting a signal corresponding to a portion of the line of digits during approximately 63.5 microseconds. Waveform $b$ illustrates the trigger by the horizontal sync pulse for the monostable multivibrator 50. Waveform $c$ illustrates the blanking signal for displaying all of the digits transmitted according to waveform $a$ and waveform $d$ illustrates the blanking signal for transmitting one of the digits (i.e., 6) under the biasing adjustment control of the potentiometer 51. The waveforms of FIG. 6 are related as to a time basis by waveform $e$ having pulses of two field periods, one being illustrated by waveform $a$ of FIG. 5. Waveform $e$ of FIG. 6 illustrates the output from the divide by 2 circuit 55 wherein pulses are received every frame of video signal made up of two fields. Waveform $f$ illustrates the reset pulse to the counter 53 after a given number of frames has been transmitted. Waveform $g$ illustrates the blanking signal for a long duration of display within the window 41 such as the signal in line L5, and waveform $h$ illustrates the blanking signal for a short duration of display of the video signal in window 41 such as the signal in line L1.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a system to form a video display window within a blanked raster of a television receiving tube, the combination of:

television receiver means for deriving a video signal corresponding to scan lines of video information for display on the television receiving tube, blanker means for defining a single video signal display window within the blanked raster of said television receiving tube, means delivering blanking pulses to said blanker means for blanking portions of selected horizontal scan lines to determine the dimensional size of said single video signal display window to display selected portions of a plurality of said scan lines of video information, and timing control means for controlling the display duration of the video information within the single display window.

2. The system of claim 1 wherein said means delivering blanking pulses include a monostable multivibrator, and adjustment means connected to said monostable multivibrator for producing a pulse width control signal determinative of the width of said video display window.

3. The system of claim 1 wherein said means for delivering blanking pulses comprises a monostable multivibrator, said system further including means for producing sync pulses including pulses corresponding to the horizontal scan rate to trigger said monostable multivibrator.

4. The system of claim 3 further including adjustment means operatively connected to said monostable multivibrator for producing a control signal determinative of the width of said video display window.

5. The system of claim 3 wherein said control means comprises a pulse counter having pulse count output lines representative of different numbers of pulse counts, said means for producing sync pulses further producing vertical sync pulses, means for applying pulses proportional to the occurring rate of said vertical sync pulses to said pulse counter, and switch means for connecting one of said pulse count output lines to said blanker means.

6. The system of claim 1 further including means for controlling the horizontal position of said display window within the raster of said receiving tube.

7. The system of claim 6 wherein said means for controlling the horizontal position of said display window includes a ramp generator, a monostable multivibrator receiving a signal from said ramp generator for delivering progressively increasing pulse width signals to said blanker means to thereby cause said display window to progressively move in the horizontal direction across the raster of said receiving tube.

8. The system according to claim 7 further comprising threshold detector means for resetting said ramp generator to a predetermined signal output level corresponding to a horizontal position of said display window at a selected vertical edge of the raster of said television receiving tube.

9. The system of claim 6 wherein said means for delivering blanking pulses further includes means for determining the number of horizontal scan lines to define the height of said display window.

10. The system of claim 9 further including means for controlling the vertical position of said display window within the raster of said receiving tube.

11. The system of claim 10 wherein said means for controlling the vertical position of said display window includes a monostable multivibrator for producing a variable width pulse controlled in response to said means for controlling the horizontal position of the display window.

* * * * *